(12) United States Patent
Yang et al.

(10) Patent No.: US 11,974,278 B2
(45) Date of Patent: Apr. 30, 2024

(54) INFORMATION REPORTING METHOD, RESOURCE ASSIGNING METHOD, FIRST TERMINAL AND SECOND TERMINAL

(71) Applicant: VIVO MOBILE COMMUNICATION CO., LTD., Guangdong (CN)

(72) Inventors: Xiaodong Yang, Dongguan (CN); Qian Zheng, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 362 days.

(21) Appl. No.: 17/384,007

(22) Filed: Jul. 23, 2021

(65) Prior Publication Data
US 2021/0352648 A1 Nov. 11, 2021

Related U.S. Application Data

(63) Continuation of application No. PCT/CN2020/073493, filed on Jan. 21, 2020.

(30) Foreign Application Priority Data

Jan. 25, 2019 (CN) .......................... 201910075150.1

(51) Int. Cl.
| | |
|---|---|
| *H04W 72/04* | (2023.01) |
| *H04W 72/20* | (2023.01) |
| *H04W 72/53* | (2023.01) |
| *H04W 4/46* | (2018.01) |
| *H04W 64/00* | (2009.01) |

(52) U.S. Cl.
CPC ........... *H04W 72/20* (2023.01); *H04W 72/53* (2023.01); *H04W 4/46* (2018.02); *H04W 64/00* (2013.01)

(58) Field of Classification Search
CPC ....... H04W 72/20; H04W 72/53; H04W 4/46; H04W 64/00; H04W 8/20; H04W 36/0072; H04W 4/02; H04W 72/12; H04W 72/04; H04W 72/08; H04W 92/18
See application file for complete search history.

(56) References Cited

U.S. PATENT DOCUMENTS

| | | | |
|---|---|---|---|
| 10,397,808 | B2 | 8/2019 | Lee et al. |
| 2008/0109343 | A1 | 5/2008 | Robinson et al. |
| 2016/0219024 | A1 | 7/2016 | Verzun et al. |
| 2018/0042043 | A1* | 2/2018 | Babaei ................. H04L 5/0082 |
| 2018/0278385 | A1 | 9/2018 | Wu et al. |

(Continued)

FOREIGN PATENT DOCUMENTS

| | | |
|---|---|---|
| CN | 101052981 A | 10/2007 |
| CN | 103517408 A | 1/2014 |

(Continued)

OTHER PUBLICATIONS

On sidelink resource allocation mechanism, France, Nov. 11, 2018 (Year: 2018).*

(Continued)

*Primary Examiner* — Mewale A Ambaye
(74) *Attorney, Agent, or Firm* — Harness, Dickey & Pierce, P.L.C.

(57) ABSTRACT

An information reporting method applied to a first terminal includes: reporting first location information to a second terminal. The first terminal is a group member in a first group, and the second terminal is a group head in the first group.

7 Claims, 4 Drawing Sheets

Receiving first location information reported by a first terminal — 201

Assigning a resource for first terminal according the first location information — 202

(56) References Cited

U.S. PATENT DOCUMENTS

| | | | |
|---|---|---|---|
| 2019/0124669 A1 | 4/2019 | Luo et al. | |
| 2020/0314916 A1* | 10/2020 | Park | H04W 4/40 |
| 2022/0070805 A1* | 3/2022 | Ohara | H04W 4/46 |
| 2022/0346079 A1* | 10/2022 | Yoshioka | H04W 72/20 |

FOREIGN PATENT DOCUMENTS

| | | | |
|---|---|---|---|
| CN | 105702018 A | 6/2016 | |
| CN | 106100982 A | 11/2016 | |
| CN | 108347772 A | 7/2018 | |
| CN | 108513357 A | 9/2018 | |
| CN | 108540544 A | 9/2018 | |
| KR | 20160018247 A | 2/2016 | |
| KR | 20190004196 A | 1/2019 | |
| WO | WO-2017133592 A1 | 8/2017 | |

OTHER PUBLICATIONS

On sidelink resource allocation mechanism for NR V2X, USA, Nov. 11, 2018 (Year: 2018).*

Supplementary European Search Report regarding European Patent Application No. 20744290.6-1218, dated Feb. 18, 2022.

First Office Action regarding Korean Patent Application No. 10-2021-7026327, dated Apr. 3, 2023. Translation provided by Bohui Intellectual Property.

Second Office Action regarding Korean Patent Application No. 10-2021-7026327, dated Jul. 3, 2023. Translation provided by Bohui Intellectual Property.

"Analysis and Design of V2X Resource Entities," Fraunhofer HHI, Fraunhofer IIS, 3GPP TSG RAN WG1 Meeting AH1901, R1-1900354, dated Jan. 25, 2019.

"Designs for NR V2X Mode 2 Resource Allocation," Fraunhofer HHI, Fraunhofer, IIS, 3GPP TSG RAN WG1 Meeting AH1901, R1-1900356, dated Jan. 25, 2019.

International Search Report and Written Opinion of the International Searching Authority regarding International Patent Application No. PCT/CN2020/073493, dated Apr. 22, 2020. Translation provided by Bohui Intellectual Property.

First Office Action regarding Chinese Patent Application No. 201910075150.1, dated Oct. 12, 2020. Translation provided by Bohui Intellectual Property.

Second Office Action regarding Chinese Patent Application No. 201910075150.1, dated Apr. 7, 2021. Translation provided by Bohui Intellectual Property.

"On Sidelink Resource Allocation Mechanism," MediaTek Inc., 3GPP TSG RAN WG1 Meeting #95, R1-1812367, dated Nov. 16, 2018.

"Sidelink Resource Allocation Mechanism for NR V2X," China Telecom, 3GPP TSG RAN WG1 Meeting #95, R1-1813087, dated Nov. 16, 2018.

"Views on Resource Allocation of NR V2X," Hisense, 3GPP TSG RAN WG1 Meeting #94bis, R1-1810179, dated Oct. 12, 2018.

"Discussion on Resource Allocation Mechanism for NR V2X," VIVO, 3GPP TSG RAN WG1 Meeting #95, R1-1812309, dated Nov. 16, 2018.

* cited by examiner

INFORMATION REPORTING METHOD, RESOURCE ASSIGNING METHOD, FIRST TERMINAL AND SECOND TERMINAL

CROSS-REFERENCE TO RELATED APPLICATIONS

This application is a Bypass Continuation Application of PCT/CN2020/073493 filed on Jan. 21, 2020, which claims priority to Chinese Patent Application No. 201910075150.1 filed on Jan. 25, 2019, which are incorporated herein by reference in their entirety.

TECHNICAL FIELD

The present disclosure relates to the technical field of communication, and in particular, to an information reporting method, a resource assigning method, a first terminal and a second terminal.

BACKGROUND

In related art, a long time evolution (LTE) system and a new radio (NR) system have supported a sidelink (or translated in a side link, an edge link and the like) for direct data transmission between terminals such as user equipment (UE) without a network device. The sidelink transmission is mainly divided into three transmission forms: broadcast, groupcast and unicast. For groupcast communication, that is, group communication, in vehicle to everything (V2X), the group of vehicle platooning has the roles of a group head (that is, a terminal on a lead vehicle) and a group member (a terminal on a member vehicle), where a possible resource scheduling mode is that the group head uniformly schedules resources. That is, not only the communication resources of the group head and the group member are assigned by the group head, but also the communication resources between the group members are assigned by the group head.

However, for the networking communication of vehicle platooning, if the communication resources in its own group or their own groups such as the communication resources between the group members are all uniformly scheduled by the group head, the group head in the related art cannot schedule resources reasonably.

SUMMARY

Embodiments of the present disclosure provide an information reporting method, a resource assigning method, a first terminal and a second terminal.

According to a first aspect, an embodiment of the present disclosure provides an information reporting method, applied to a first terminal, including:
reporting first location information to a second terminal,
where the first terminal is a group member in a first group, and the second terminal is a group head in the first group.

According to a second aspect, an embodiment of the present disclosure provides a resource assigning method, applied to a second terminal, including:
receiving first location information reported by a first terminal; and
assigning a resource for the first terminal according to the first location information,
where the first terminal is a group member in a first group, and the second terminal is a group head in the first group.

According to a third aspect, an embodiment of the present disclosure provides a resource assigning method, applied to a second terminal, including:
receiving first resource indicating information sent by a third terminal,
where the second terminal is a group head in a first group, the third terminal is a group head in a second group, and the first resource indicating information is used to indicate a resource used by intra-group communication of the second group.

According to a fourth aspect, an embodiment of the present disclosure provides a resource assigning method, applied to a second terminal, including:
receiving first location indicating information sent by a third terminal,
where the second terminal is a group head in a first group, the third terminal is a group head in a second group, and the first location indicating information is used to indicate second location information of a group member and/or a group head in the second group.

According to a fifth aspect, an embodiment of the present disclosure provides a first terminal, including:
a reporting module, configured to report first location information to a second terminal,
where the first terminal is a group member in a first group, and the second terminal is a group head in the first group.

According to a sixth aspect, an embodiment of the present disclosure provides a second terminal, including:
a first receiving module, configured to receive first location information reported by a first terminal; and
an assignment module, configured to assign a resource for the first terminal according to the first location information,
where the first terminal is a group member in a first group, and the second terminal is a group head in the first group.

According to a seventh aspect, an embodiment of the present disclosure provides a second terminal, including:
a fifth receiving module, configured to receive first resource indicating information sent by a third terminal,
where the second terminal is a group head in a first group, the third terminal is a group head in a second group, and the first resource indicating information is used to indicate a resource used by intra-group communication of the second group.

According to an eighth aspect, an embodiment of the present disclosure provides a second terminal, including:
a sixth receiving module, configured to receive first location indicating information sent by a third terminal,
where the second terminal is a group head in a first group, the third terminal is a group head in a second group, and the first location indicating information is used to indicate second location information of a group member and/or a group head in the second group.

According to a ninth aspect, an embodiment of the present disclosure provides a terminal, including a memory, a processor and a computer program which is stored in the memory and executable on the processor, where when the computer program is executed by the processor, the steps of the above information reporting method, the steps of the above resource assigning method, the steps of the above resource indicating method, or the steps of the above location indicating method are implemented. The terminal is optionally a first terminal or a second terminal.

According to a tenth aspect, an embodiment of the present disclosure provides a non-transitory computer-readable storage medium, storing a computer program, where when the computer program is executed by the processor, the steps of the above information reporting method, the steps of the above resource assigning method, the steps of the above resource indicating method, or the steps of the above location indicating method are implemented.

BRIEF DESCRIPTION OF DRAWING

To describe the technical solutions in the embodiments of the present disclosure more clearly, the following briefly describes the accompanying drawings required in the embodiments of the present disclosure. Apparently, the accompanying drawings in the following descriptions show merely some embodiments of the present disclosure, and a person of ordinary skill in the art may still derive other accompanying drawings from these accompanying drawings.

DETAILED DESCRIPTION OF EMBODIMENTS

To describe the technical solutions in the embodiments of the present disclosure more clearly, the following briefly describes the accompanying drawings required in the embodiments of the present disclosure. Apparently, the accompanying drawings in the following descriptions show merely some embodiments of the present disclosure, and a person of ordinary skill in the art may still derive other accompanying drawings from these accompanying drawings.

The term "and/or" herein is merely used to describe an association relationship of associated objects, which represents three kinds of relationships. For example, the phrase "A and/or B" represents three conditions: A exists alone, both A and B exist, and B exists alone.

First of all, it is pointed out that the technology described in the present application is not limited to an LTE system and an LTE-advanced (LTE-A) system, and may also be applied to an NR system, a more advanced system and the like. Terms "first", "second", etc. in the description and claims of the present application are used to distinguish similar objects, instead of describing a specific sequence or order. It should be understood that the data used in such a way is interchangeable in proper circumstances, so that the embodiments of the present application described herein can be implemented in a sequence other than the sequence illustrated or described herein. Moreover, the terms "including", "having", and any other variants mean to cover the non-exclusive inclusion, for example, a process, method, system, product, or device that includes a series of steps or units is not necessarily limited to those steps or units which are clearly listed, but may include other steps or units which are not expressly listed or are inherent to such a process, method, product, or device.

Embodiments of the present disclosure are applicable to multicast communication scenes in V2X. In the embodiments of the present disclosure, a first group and a second group may be understood as a group of vehicle platooning. For example, the first group includes a group head (i.e. group leader) and a group member, where the group head may be understood as a terminal on a lead vehicle (i.e. head vehicle) in the first group, and the group member may be understood as a terminal on a member vehicle in the first group. The second group includes a group head and a group member, where the group head may be understood as a terminal on a lead vehicle in the second group, and the group member may be understood as a terminal on a member vehicle in the second group. The first group and the second group are different groups.

Optionally, in the same group, the number of the group member may be one or more; and the number of the group head may be one, but is not limited to this, for example, the number may be two.

In an implementation manner, in the same group, a group member may report location information to a group head; and the group head may receive the location information reported by the group member and uniformly schedule communication resources in their own groups according to the location information of the group member.

In an implementation manner, a group head in one group may uniformly schedule communication resources in their own groups according to location information of the group member in this group and location information of group members in other groups.

In another implementation manner, group heads in different groups may mutually negotiate resource assignment situations.

In another implementation manner, group heads in different groups may communicate location information of terminals (including a group head and/or a group member) in their own groups.

The following describes the present disclosure in detail with reference to the embodiments and accompanying drawings.

Figure 1:
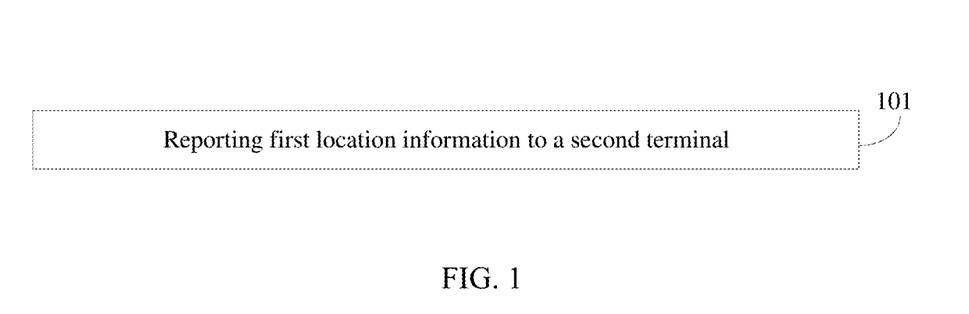
FIG. 1 is a flowchart of an information reporting method according to an embodiment of the present disclosure.

Referring to FIG. 1 which is a flowchart of an information reporting method provided by an embodiment of the present disclosure, the method is applied to a first terminal, and the first terminal is a group member in a first group. As shown in FIG. 1, the method may include the following steps:

Step 101: reporting first location information to a second terminal, where the second terminal is a group head in the first group. The first location information is used for the second terminal to assign a resource for the first terminal, that is, the second terminal may assign a resource for the first terminal according to the first location information.

During an implementation, the resource assigned for the first terminal may be a communication resource between the first terminal and the second terminal, and may also be a communication resource between the first terminal and other first terminal. When the resource is assigned according to the location information, since the distant terminals (i.e. group members that are far apart) have smaller mutual interference and the terminals with short distances (i.e. group members that are nearby) have larger mutual interference, the same resource may be reused for the distant terminals, and different resources may be used for the proximal terminals, thereby reducing interference.

In this embodiment, the above first location information may include at least one of:
  a region identity, longitude and latitude information, distance information relative to the group head, or direction angle information relative to through the group head.

According to the information reporting method provided by the embodiment of the present disclosure, the first terminal reports the first location information to the second terminal, the first terminal is the group member in the first group, and the second terminal is the group head in the first group, so that the second terminal assigns the resources for the first terminal according to the location information of the first terminal, all proximal terminals in the same group are prevented from using the same resource, resource use conflict is avoided, interference is reduced, and it is ensured that the group head reasonably schedules the communication resources in their own groups.

In the embodiment of the present disclosure, after the group of vehicle platooning is established, the group member may report location information (that is, geographical location information) based on indication of the group head or configuration.

Optionally, the above step 101 may include at least one of:
  reporting the first location information to the second terminal based on a preset trigger event; or
  periodically reporting the first location information to the second terminal according to a preset period.

In this way, reporting the location information based on the preset trigger event may enable the group head to acquire location information of the group member timely and effectively; and compared with the reporting the location information based on the preset trigger event, periodically reporting the location information may prevent the group member from judging the preset trigger event and reduce the power consumption of the group member.

In this embodiment, the preset trigger event may include at least one of:
  the measured reference signal received power of a target terminal is less than a first preset threshold;
  the measured reference signal received power of the target terminal is greater than a second preset threshold;
  a distance relative to the target terminal exceeds a third preset threshold; or
  a variation value of direction angle relative to the target terminal reaches a fourth preset threshold,
  where the target terminal is at least one of the group member or the group leader in the first group.

It may be understood that the first preset threshold, the second preset threshold, the third preset threshold and the fourth preset threshold may be preset according to the actual situation, which is not limited by the embodiment of the present disclosure.

Figure 2:
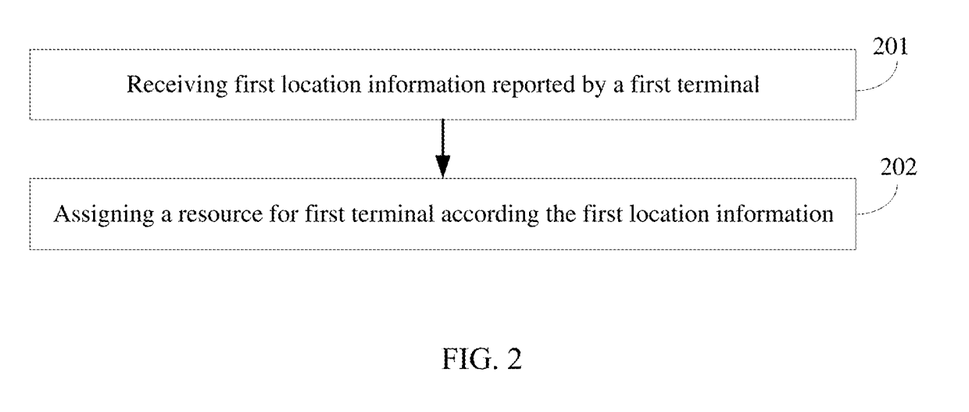
FIG. 2 is a flowchart of a resource assigning method according to an embodiment of the present disclosure.

Referring to FIG. 2 which is a flowchart of a resource assigning method provided by an embodiment of the present disclosure, the method is applied to a second terminal, and the second terminal is a group head in a first group. As shown in FIG. 2, the method may include the following steps:

Step 201: receiving first location information reported by a first terminal.

The first terminal is a group head in the first group. The first location information is used for the second terminal to assign a resource for the first terminal, that is, the second terminal may assign a resource for the first terminal according to the first location information.

Step 202: assigning a resource for the first terminal according to the first location information.

In this embodiment, the resource assigned for the first terminal may be a communication resource between the first terminal and the second terminal, and may also be a communication resource between the first terminal and other first terminal. When the resource is assigned according to the location information, since the distant terminals (i.e. group members that are far apart) have smaller mutual interference and the terminals with short distances (i.e. group members that are nearby) have larger mutual interference, the same resource may be reused for the distant terminals, and different resources may be used for the proximal terminals, thereby reducing interference.

The above first location information may include at least one of:
  a region identity, longitude and latitude information, distance information relative to the group head, or direction angle information relative to the group head.

According to the resource assigning method provided by the embodiment of the present disclosure, the second terminal receives the first location information reported by the first terminal and assigns the resource for the first terminal according to the first location information, the first terminal is a group member in a first group, and the second terminal is a group head in the first group, thereby preventing all proximal terminals in the same group from using the same resource, avoiding resource use conflict, reducing interference and ensuring that the group head reasonably schedules the communication resources in their own groups.

In the embodiment of the present disclosure, when assigning the resource for the first terminal, the second terminal may also consider the influence between the terminals in different groups in addition to considering the influence between the terminals in the same group. Optionally, before the above step 202, the method may further include:
  receiving first resource indicating information sent by a third terminal.

The third terminal is a group head in a second group, and the first resource indicating information is used to indicate a resource used by intra-group communication of the second group. The first group and the second group are different groups. When the resource indicating information sent by the third terminal is received, the second terminal and the third terminal may discover and communicate with each other, that is, the first group is proximal to the second group.

The above step 202 may include:
  assigning a resource for the first terminal by a target resource according to the first location information, the target resource being a resource except for the resource indicated by the first resource indicating information.

Moreover, the method further includes:
  sending second resource indicating information to the third terminal, where the second resource indicating information is used to indicate a resource used by intra-group communication of the first group, so that when assigning the communication resource in its own group, the third terminal can consider the influence of the communication resource in the first group.

In this way, the resource assignment situation may be mutually negotiated between the group heads in different groups, so that conflict of the resources used by the proximal groups is avoided and interference is reduced.

For example, in a group 1 of vehicle platooning, a vehicle 1 is a lead vehicle, a vehicle 2 and a vehicle 3 are member vehicles, UE1 on the vehicle 1 is a group head, UE2 on the vehicle 2 is a group member, and UE3 on the vehicle 3 is a group member; and in a group 2, a vehicle 4 is a lead vehicle, a vehicle 5 and a vehicle 6 are member vehicles, UE4 on the vehicle 4 is a group head, UE5 on the vehicle 5 is a group member, and UE6 on the vehicle 6 is a group member. The UE1 is responsible for resource assignment of all UE communication under the group 1, and the UE4 is responsible for resource assignment of all UE communication in the group 2.

When the group 1 is closer to the group 2, that is, the UE1 and the UE4 may discover and communicate with each other, the UE1 and the UE4 may negotiate the use of the resources. For example, the UE1 sends resource indicating information 1 to the UE4, and the resource indicating information 1 indicates that the resources of all the UE communication under the group 1 are selected from a resource pool 1, a resource pool 3 and a resource pool 5; meanwhile, the UE4 sends resource indicating information 2 to the UE1, and the resource indicating information 2 indicates that the resources of all the UE communication under the group 2 are selected from a resource pool 2, a resource pool 4 and a resource pool 6.

In this way, the UE1 may avoid the resource pool 2, the resource pool 4 and the resource pool 6 during resource assignment, and the UE4 may avoid the resource pool 1, the resource pool 3 and the resource pool 5 during resource assignment, so that conflict of the resources used by the proximal groups is avoided and interference is reduced.

Optionally, before the above step 202, the method may further include:
  receiving first location indicating information sent by a third terminal.

The third terminal is a group head in a second group, and the first location indicating information is used to indicate second location information of a group member and/or a group head in the second group. The first group and the second group are different groups. When the location indicating information sent by the third terminal is received, the second terminal and the third terminal may discover and communicate with each other, that is, the first group is proximal to the second group.

The above step 202 may include:
  assigning a resource for the first terminal by a target resource according to the first location information and the second location information.

During an implementation, if it is determined that the terminals in the first group and the terminals in the second group are far apart (for example, the distance between the terminals in the first group and the terminals in the second group exceeds a preset threshold) according to the first location information and the second location information, the above target resource may be selected as all resources schedulable by the second terminal; and if it is determined that the terminals in the first group and the terminals in the second group are partially far apart (for example, exceeding a preset threshold) according to the first location information and the second location information, the second terminal may select the target resource based on pre-configuration, or select the target resource by negotiating with the third terminal, thereby preventing the proximal terminals from using the same resource and avoiding the resource use conflict.

Optionally, before the step that the resource is assigned for the first terminal by the target resource according to the first location information and the second location information, the method further includes:
  receiving first resource indicating information sent by the third terminal,
    where the first resource indicating information is used to indicate a resource used by intra-group communication of the second group, and the target resource is a resource except for the resource indicated by the first resource indicating information.

In this way, the second terminal may assign the communication resources in their own groups according to the location indicating information and the resource indicating information sent by the third terminal, thereby avoiding resource use conflict and ensuring reasonable resource scheduling.

Moreover, the method further includes:
  sending second location indicating information to the third terminal, where the second location indicating information is used to indicate first location information of the group member and/or group head in the first group, so that when assigning the communication resources in its own group, the third terminal can consider the influence of the location of the terminal in the first group.

In this way, location information of the terminals in their own groups may be communicated between the group heads in different groups, so that conflict of the resources used by all the proximal terminals is avoided and interference is reduced.

For example, in a group 1 of vehicle platooning, a vehicle 1 is a lead vehicle, a vehicle 2 and a vehicle 3 are member vehicles, UE1 on the vehicle 1 is a group head, UE2 on the vehicle 2 is a group member, and UE3 on the vehicle 3 is a group member; and in a group 2, a vehicle 4 is a lead vehicle, a vehicle 5 and a vehicle 6 are member vehicles, UE4 on the vehicle 4 is a group head, UE5 on the vehicle 5 is a group member, and UE6 on the vehicle 6 is a group member. The UE1 is responsible for resource assignment of all UE communication under the group 1, and the UE4 is responsible for resource assignment of all UE communication in the group 2. The UE2 and the UE3 may report their own location information to the UE1, and the UE5 and the UE6 may report their own location information to the UE4.

When the group 1 is proximal to the group 2, that is, the UE1 and the UE4 may discover and communicate with each other, the UE1 and the UE4 may mutually inform the location information of the UE (at least including UE on the member vehicle, and further including UE on the lead vehicle) in their own groups. For example, the UE1 sends location indicating information 1 to the UE4, and the location indicating information 1 indicates the location information of the UE2 and the UE3 under the group 1; meanwhile, the UE4 sends location indicating information 2 to the UE1, and the location indicating information 2 indicates the location information of the UE5 and the UE6 under the group 2.

In this way, during resource assignment, the UE1 and the UE4 may comprehensively consider the location information of all the group member UEs under the group 1 and the group 2, thereby avoiding conflict of resources used by all the proximal UEs and reducing interference.

Figure 3:
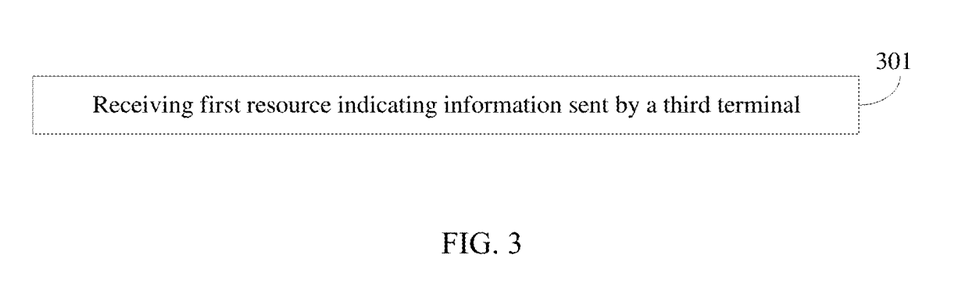
FIG. 3 is a flowchart of a resource indicating method according to an embodiment of the present disclosure.

Referring to FIG. 3 which is a flowchart of a resource indicating method provided by an embodiment of the present disclosure, the method is applied to a second terminal, and the second terminal is a group head in a first group. As shown in FIG. 3, the method includes the following steps:

Step 301: receiving first resource indicating information sent by a third terminal.

The third terminal is a group head in a second group, and the first resource indicating information is used to indicate a resource used by intra-group communication of the second group. The first group and the second group are different groups. When the resource indicating information sent by the third terminal is received, the second terminal and the third terminal may discover and communicate with each other.

Optionally, the method may further include:
sending second resource indicating information to the third terminal,
where the second resource indicating information is used to indicate a resource used by intra-group communication of the first group.

In this way, the resource assignment situation may be mutually negotiated between the group heads in different groups, so that conflict of the resources used by the proximal groups is avoided and interference is reduced.

Figure 4:
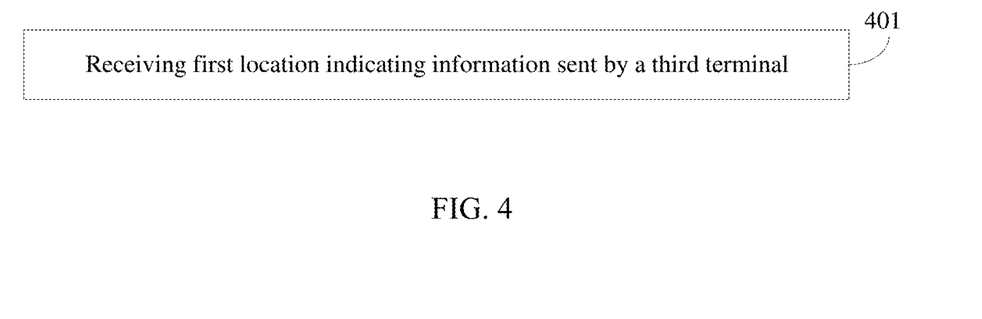
FIG. 4 is a flowchart of a location indicating method according to an embodiment of the present disclosure.

Referring to FIG. 4 which is a flowchart of a resource indicating method provided by an embodiment of the present disclosure, the method is applied to a second terminal, and the second terminal is a group head in a first group. As shown in FIG. 4, the method includes the following steps:

Step 401: receiving first location indicating information sent by a third terminal.

The third terminal is a group head in a second group, and the first location indicating information is used to indicate second location information of a group member and/or a group head in the second group. The first group and the second group are different groups. When the location indicating information sent by the third terminal is received, the second terminal and the third terminal may discover and communicate with each other.

Optionally, the method may further include:
sending second location indicating information to the third terminal,
where the second location indicating information is used to indicate first location information of a group member and/or a group head in the first group.

In this way, location information of the terminals in their own groups may be communicated between the group heads in different groups, so that conflict of the resources used by all the proximal terminals is avoided and interference is reduced.

Figure 5:
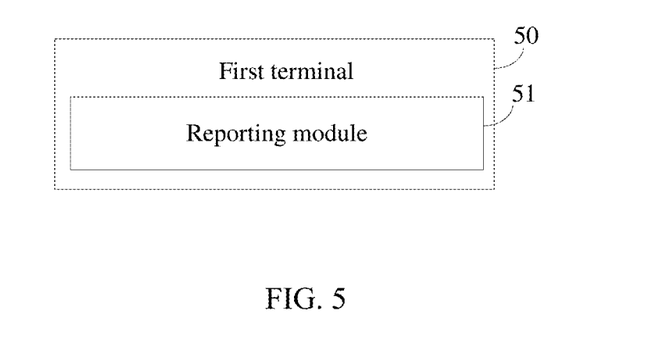
FIG. 5 is a structural schematic diagram of a first terminal according to an embodiment of the present disclosure.

Referring to FIG. 5, FIG. 5 is a structural schematic diagram provided by an embodiment of the present disclosure. As shown in FIG. 5, the first terminal 50 includes:

a reporting module 51, configured to report first location information to a second terminal,
where the first terminal is a group member in a first group, and the second terminal is a group head in the first group.

In the embodiment of the present disclosure, the first terminal reports the first location information to the second terminal, the first terminal is the group member in the first group, and the second terminal is the group head in the first group, so that the second terminal may assign the resources for the first terminal according to the location information of the first terminal, all proximal terminals in the same group are prevented from using the same resource, resource use conflict is avoided, interference is reduced, and it is ensured that the group head reasonably schedules the communication resources in its own group.

In the embodiment of the present disclosure, optionally, the reporting module 51 is configured to perform at least one of:
reporting the first location information to the second terminal based on a preset trigger event; or
periodically reporting the first location information to the second terminal according to a preset period.

Optionally, the preset trigger event includes at least one of:
the measured reference signal received power of a target terminal is less than a first preset threshold;
the measured reference signal received power of the target terminal is greater than a second preset threshold;
a distance relative to the target terminal exceeds a third preset threshold; or
a variation value of direction angle relative to the target terminal reaches a fourth preset threshold,
where the target terminal is at least one of the group member or the group leader in the first group.

Optionally, the first location information includes at least one of:
a region identity, longitude and latitude information, distance information relative to the group head, or direction angle information relative to the group head.

Figure 6:
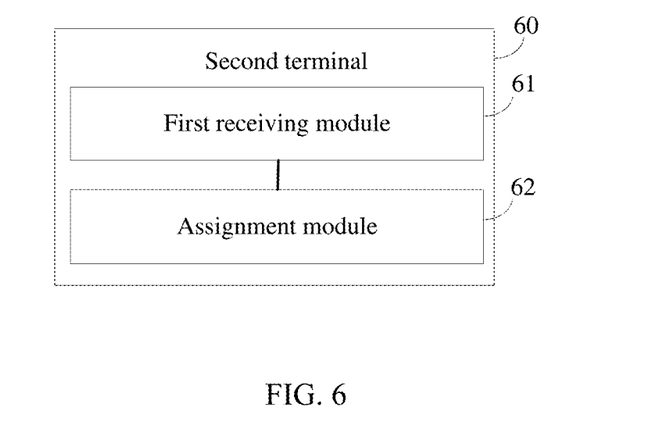
FIG. 6 is a first structural schematic diagram of a second terminal according to an embodiment of the present disclosure.

Referring to FIG. 6, FIG. 6 is a structural schematic diagram of a second terminal provided by an embodiment of the present disclosure. As shown in FIG. 6, the second terminal 60 includes:

a first receiving module 61, configured to receive first location information reported by a first terminal; and
an assignment module 62, configured to assign a resource for the first terminal according to the first location information,
where the first terminal is a group member in a first group, and the second terminal is a group head in the first group.

In the embodiment of the present disclosure, the second terminal receives the first location information reported by the first terminal and assigns the resource for the first terminal according to the first location information, the first terminal is a group member in a first group, and the second terminal is a group head in the first group, thereby preventing all proximal terminals in the same group from using the same resource, avoiding resource use conflict, reducing interference and ensuring that the group head reasonably schedules the communication resources in its own group.

In the embodiment of the present disclosure, optionally, the second terminal further includes:
a second receiving module, configured to receive first resource indicating information sent by a third terminal, where the third terminal is a group header in a second group, and the first resource indicating information is used to indicate a resource used by intra-group communication of the second group.

The assignment module is configured to:
a resource is assigned for the first terminal by a target resource according to the first location information, where the target resource is a resource except for the resource indicated by the first resource indicating information.

Optionally, the second terminal further includes:
a first sending module, configured to send second resource indicating information to the third terminal, where the second resource indicating information is used to indicate a resource used by intra-group communication of the first group.

Optionally, the second terminal further includes:

a third receiving module, configured to receive first location indicating information sent by a third terminal, where the third terminal is a group head in a second group, and the first location indicating information is used to indicate second location information of a group member and/or a group head in the second group.

The assignment module is configured to:

assign a resource for the first terminal by a target resource according to the first location information and the second location information.

Optionally, the second terminal further includes:

a second sending module, configured to send second location indicating information to the third terminal, where the second location indicating information is used to indicate first location information of a group member and/or a group head in the first group.

Optionally, the second terminal further includes:

a fourth receiving module, configured to receive first resource indicating information sent by the third terminal, where the first resource indicating information is used to indicate a resource used by intra-group communication of the second group, and the target resource is a resource except for the resource indicated by the first resource indicating information.

Figure 7:
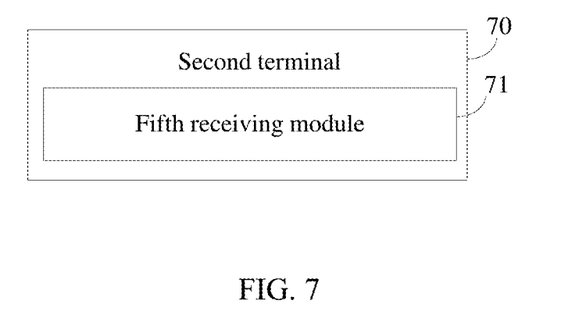
FIG. 7 is a second structural schematic diagram of a second terminal according to an embodiment of the present disclosure.

Referring to FIG. 7, FIG. 7 is a structural schematic diagram of a second terminal provided by an embodiment of the present disclosure. As shown in FIG. 7, the second terminal 70 includes:

a fifth receiving module 71, configured to receive first resource indicating information sent by a third terminal, where the second terminal is a group head in a first group, the third terminal is a group head in a second group, and the first resource indicating information is used to indicate a resource used by intra-group communication of the second group.

Optionally, the second terminal further includes:

a third sending module, configured to send second resource indicating information to the third terminal, where the second resource indicating information is used to indicate a resource used by intra-group communication of the first group.

In the embodiment of the present disclosure, the resource assignment situation may be mutually negotiated between the group heads in different groups, thereby avoiding conflict of the resources used by the proximal groups and reducing interference.

Figure 8:
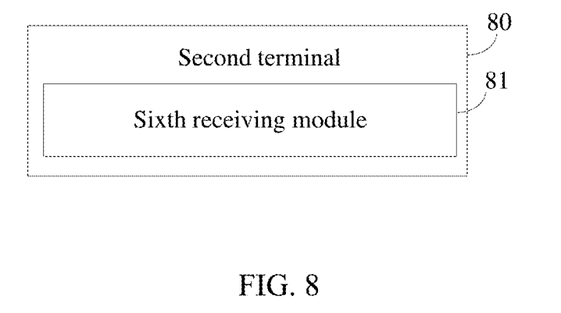
FIG. 8 is a third structural schematic diagram of a second terminal according to an embodiment of the present disclosure.

Referring to FIG. 8, FIG. 8 is a structural schematic diagram of a second terminal provided by an embodiment of the present disclosure. As shown in FIG. 8, the second terminal 80 includes:

a sixth receiving module 81, configured to receive first location indicating information sent by a third terminal, where the second terminal is a group head in a first group, the third terminal is a group head in a second group, and the first location indicating information is used to indicate second location information of a group member and/or a group head in the second group.

Optionally, the second terminal further includes:

a fourth sending module, configured to send second location indicating information to the third terminal, where the second location indicating information is used to indicate first location information of a group member and/or a group head in the first group.

In the embodiment of the present disclosure, the location information of the terminals in their own groups may be communicated between the group heads in different groups, so that conflict of the resources used by all the proximal terminals is avoided and interference is reduced.

In addition, the embodiment of the present disclosure further provides a first terminal, including a processor, a memory and a computer program which is stored in the memory and executable on the processor, where when the computer program is executed by the processor, processes of the above information reporting method embodiments are implemented, and the same technical effect can be achieved. In order to avoid repetition, details are not described herein again.

The embodiment of the present disclosure further provides a second terminal, including a processor, a memory and a computer program which is stored in the memory and executable on the processor, where when the computer program is executed by the processor, processes of the above resource assigning method embodiments, processes of the above resource indicating method embodiments, or processes of the above location indicating method embodiments are implemented, and the same technical effect can be achieved. In order to avoid repetition, details are not described herein again.

Figure 9:
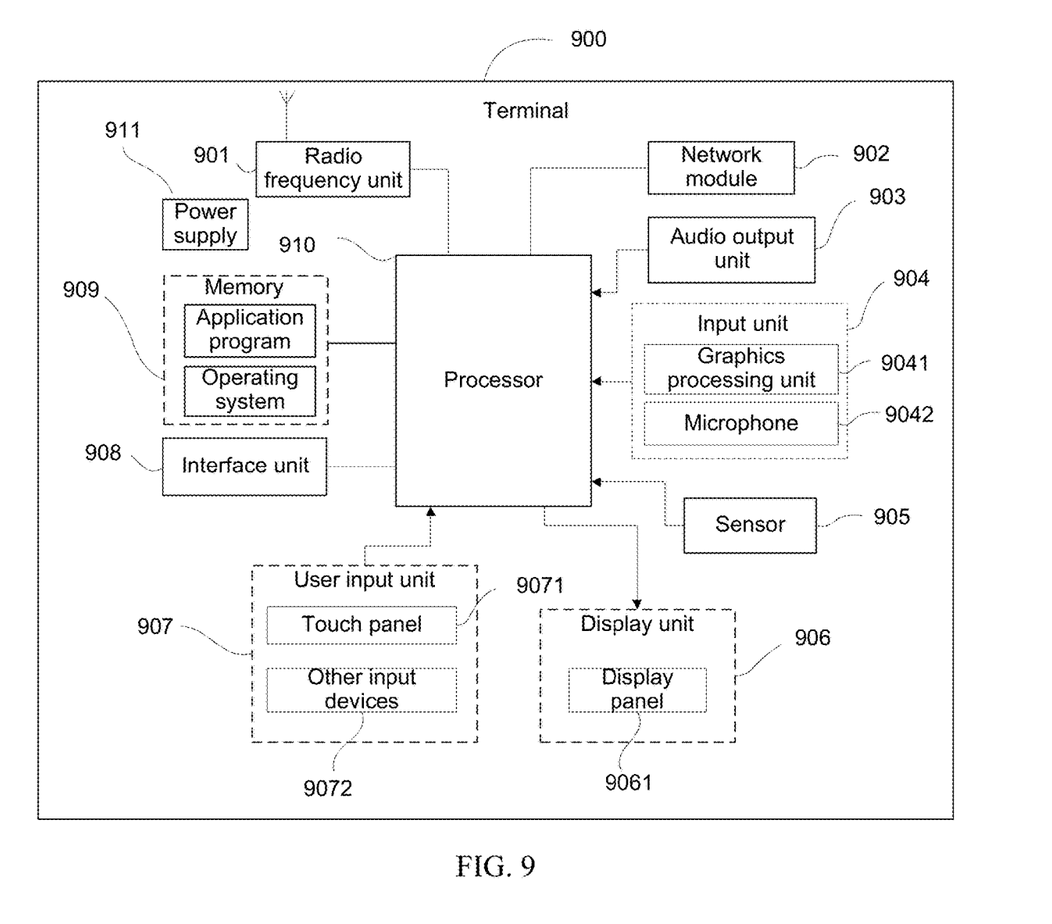
FIG. 9 is a structural schematic diagram of a terminal according to an embodiment of the present disclosure.

FIG. 9 is a structural schematic diagram of hardware of a terminal for implementing various embodiments of the present disclosure. The terminal 900 includes, but is not limited to: a radio frequency unit 901, a network module 902, an audio output unit 903, an input unit 904, a sensor 905, a display unit 906, a user input unit 907, an interface unit 908, a memory 909, a processor 910, a power supply 911, and the like. Those skilled in the art may understand that the terminal structure shown in FIG. 9 does not constitute a limitation to the terminal. The terminal may include more or fewer components than those shown in the figure, or some components may be combined, or there may be a different component arrangement. In the embodiments of the present disclosure, the terminal includes, but is not limited to, a mobile phone, a tablet computer, a notebook computer, a palmtop computer, a vehicle-mounted terminal, a wearable device, a pedometer, or the like.

The terminal 900 is optionally a first terminal or a second terminal. When the terminal 900 is the first terminal, the terminal 900 may implement the processes of the above method embodiment shown in FIG. 1, and the same technical effect can be achieved. To avoid repetition, details are not described herein again.

When the terminal 900 is the second terminal, the terminal 900 may implement the processes of the above method embodiment shown in FIG. 2, or the processes of the above method embodiment shown in FIG. 3, or the processes of the above method embodiment shown in FIG. 4, and the same technical effect can be achieved. To avoid repetition, details are not described herein again.

When the terminal 900 is the first terminal, the radio frequency unit 901 may be configured to report location information. When the terminal 900 is the second terminal, the radio frequency unit 901 may be configured to receive location information, and the processor 910 may be configured to assign a resource for the corresponding terminal according to the received location information. And/or when the terminal 900 is the second terminal, the radio frequency unit 901 may be configured to receive and send resource indicating information and/or location indicating information.

It should be understood that, in the embodiments of the present disclosure, the radio frequency unit 901 may be configured to receive and send information or receive and send a signal in a call process. For example, after receiving downlink data from a base station, the radio frequency unit 901 sends the downlink data to the processor 910 for processing. In addition, the radio frequency unit 901 sends uplink data to the base station. Generally, the radio frequency unit 901 includes, but is not limited to, an antenna, at least one amplifier, a transceiver, a coupler, a low noise amplifier, a duplexer, and the like. In addition, the radio frequency unit 901 may further communicate with a network and other devices by using a wireless communications system.

The terminal provides wireless broadband Internet access for a user by using the network module 902, for example, helping the user to receive and send an email, browse a web page, and access streaming media.

The audio output unit 903 can convert audio data received by the radio frequency unit 901 or the network module 902 or stored in the memory 909 into an audio signal, and output the audio signal as sound. In addition, the audio output unit 903 may further provide audio output (for example, a call signal received voice, or a message received voice) related to a specific function executed by the terminal 900. The audio output unit 903 includes a speaker, a buzzer, a receiver, and the like.

The input unit 904 is configured to receive audio or video signals. The input unit 904 may include a graphics processing unit (GPU) 9041 and a microphone 9042. The graphics processing unit 9041 is configured to process image data of a static picture or a video obtained by an image capturing device (for example, a camera) in a video capturing mode or an image capturing mode. A processed image frame may be displayed on the display unit 906. The image frame processed by the graphics processing unit 9041 may be stored in the memory 909 (or other storage mediums) or sent by using the radio frequency unit 901 or the network module 902. The microphone 9042 may receive a sound and can process such sound into audio data. The audio data obtained through processing may be converted, in a telephone call mode, into a format that may be sent to a mobile communication base station via the radio frequency unit 901 for output.

The terminal 900 further includes at least one sensor 905, for example, a light sensor, a motion sensor, and other sensors. For example, the light sensor includes an ambient light sensor and a proximity sensor, where the ambient light sensor may adjust brightness of a display panel 9061 based on brightness of ambient light, and the proximity sensor can turn off the display panel 9061 and/or backlight when the terminal 900 is moved towards an ear. As a type of the motion sensor, an accelerometer sensor may detect magnitude of an acceleration in each direction (generally three axes), and may detect magnitude and a direction of gravity when being static. The accelerometer sensor may be used for recognizing a terminal gesture (for example, horizontal and vertical screen switching, a related game, or magnetometer posture calibration), a function related to vibration recognition (for example, a pedometer or a strike), or the like. The sensor 905 may further include a fingerprint sensor, a pressure sensor, an iris sensor, a molecular sensor, a gyroscope, a barometer, a hygrometer, a thermometer, an infrared sensor, and the like. This is not described herein.

The display unit 906 is configured to display information entered by a user or information provided for a user. The display unit 906 may include the display panel 9061, and the display panel 9061 may be configured in a form of a liquid crystal display (LCD), an organic light-emitting diode (OLED), or the like.

The user input unit 907 may be configured to receive input numeral or character information, and generate key signal input related to user setting and function control of the terminal. For example, the user input unit 907 includes a touch panel 9071 and another input device 9072. The touch panel 9071, also called a touch screen, may collect touch operation on or near the touch panel by users (for example, operation on the touch panel 9071 or near the touch panel 9071 by fingers or any suitable objects or accessories such as a touch pen by the users). The touch panel 9071 may include two parts: a touch detection device and a touch controller. The touch detection device detects a touch position of a user, detects a signal brought by a touch operation, and transmits the signal to the touch controller. The touch controller receives touch information from the touch detection device, converts the touch information into touch point coordinates, sends the touch point coordinates to the processor 910, and receives and executes a command from the processor 910. In addition, the touch panel 9071 may be implemented by various types, such as a resistive type, a capacitive type, an infrared type, a surface acoustic wave type, or the like. The user input unit 907 may further include another input device 9072 in addition to the touch panel 9071. For example, the another input device 9072 may include, but is not limited to, a physical keyboard, function keys (such as a volume control key and a switch key), a trackball, a mouse, and a joystick. Details are not described herein.

Further, the touch panel 9071 can cover the display panel 9061. When detecting a touch operation on or near the touch panel 9071, the touch panel 9071 transmits the touch operation to the processor 910 to determine a type of a touch event. Then the processor 910 provides corresponding visual output on the display panel 9061 based on the type of the touch event. Although in FIG. 9, the touch panel 9071 and the display panel 9061 are used as two independent components to implement input and output functions of the terminal, in some embodiments, the touch panel 9071 and the display panel 9061 may be integrated to implement the input and output functions of the mobile terminal. This is not specifically limited herein.

The interface unit 908 is an interface for connecting an external device to the terminal 900. For example, the external device may include a wired or wireless headset jack, an external power supply (or a battery charger) port, a wired or wireless data port, a storage card port, a port for connecting an device having an identification module, an audio input/output (I/O) port, a video I/O port, a headset jack, or the like. The interface unit 908 may be configured to receive an input (for example, data information and power) from the external device and transmit the received input to one or more elements in the terminal 900, or transmit data between the terminal 900 and the external device.

The memory 909 may be configured to store software programs and various data. The memory 909 may mainly include a program storage area and a data storage area. The program storage area may store an operating system, an application required by at least one function (for example, a sound play function or an image display function), and the like. The data storage area may store data (for example, audio data or an address book) or the like created based on use of the mobile phone. In addition, the memory 909 may include a high-speed random access memory, and may further include a non-volatile memory, for example, at least one magnetic disk storage device, a flash memory device, or another volatile solid-state storage device.

The processor 910 is a control center of the terminal, and connects all parts of the entire terminal by using various interfaces and lines. By running or executing a software program and/or a module stored in the memory 909 and invoking data stored in the memory 909, the processor 910 performs various functions of the terminal and data processing, so as to perform overall monitoring on the terminal. The processor 910 may include one or more processing units. Optionally, the processor 910 may integrate an application processor and a modem processor. The application processor mainly processes the operating system, a user interface, the application program, and the like, and the modem processor mainly processes wireless communication. It may be understood that the foregoing modem processor may not be integrated into the processor 910.

The terminal 900 may also include the power supply 911 (for example, a battery) that supplies power to various components. Optionally, the power supply 911 may be logically connected to the processor 910 by using a power supply management system, to implement functions of managing charging, discharging, and power consumption by using the power supply management system.

In addition, the user equipment 900 may further include some functional modules not shown. Details are not described herein again.

The embodiments of the present disclosure further provide a non-transitory computer-readable storage medium. The non-transitory computer-readable storage medium stores a computer program, where when the computer program is executed by a processor, the processes of the above information reporting method embodiment, the processes of the above resource assigning method embodiment, the processes of the above resource indicating method embodiment, or the processes of the above location indicating method embodiment are implemented, and the same technical scheme can be achieved. To avoid repetition, details are not described herein again. The non-transitory computer-readable storage medium is, for example, a read-only memory (ROM), a random access memory (RAM), a magnetic disk, an optical disk, or the like.

It should be noted that in this specification, the terms "comprise", "include" and any other variants thereof are intended to cover non-exclusive inclusion, so that a process, a method, an article, or an device that includes a series of elements not only includes these very elements, but may also include other elements not expressly listed, or also include elements inherent to this process, method, article, or device. In the absence of more limitations, an element defined by "including a . . . " does not preclude the existence of other identical elements in the process, method, article, or apparatus that includes the element.

Based on the foregoing descriptions of the implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the related art may be implemented in a form of a software product. The computer software product is stored in a readable storage medium (such as a ROM/RAM, a magnetic disk, or a compact disc), and includes several instructions for instructing a terminal (which may be a mobile phone, a computer, a server, an air conditioner, a network device, or the like) to perform the methods described in the embodiments of the present disclosure.

Those of ordinary skill in the art can realize that the exemplary units and algorithm steps described with reference to the embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed operating process of the foregoing system, apparatus, and unit, refer to a corresponding process in the foregoing method embodiments. Details are not described herein again.

In the embodiments provided in this application, it should be understood that the disclosed device and method may be implemented in other manners. For example, the described device embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the devices or units may be implemented in electronic, mechanical, or other forms.

The units described as separate parts may or may not be physically separate, and parts displayed as units may or may not be physical units, that is, may be located in one location, or may be distributed on a plurality of network units. Some or all of the units may be selected based on actual requirements to achieve the objectives of the solutions of the embodiments.

In addition, function units in the embodiments of the present disclosure may be integrated into one processing unit, or each of the units may exist alone physically, or two or more units are integrated into one unit.

If the function is implemented in the form of software function units and sold or used as independent products, the function may be stored in a non-transitory computer-readable storage medium. Based on such an understanding, the technical solutions of the present disclosure essentially, or the part contributing to the related art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present disclosure. The storage medium includes various mediums, such as a USB flash disk, a removable hard disk, a ROM, a RAM, a magnetic disk, or an optical disc, that can store program code.

A person of ordinary skill in the art can understand that all or some of the procedures in the methods of the foregoing embodiments may be implemented by a computer program controlling related hardware. The program may be stored in a non-transitory computer-readable storage medium. When the program is executed, the procedures of the embodiments of the foregoing methods may be performed. The foregoing storage medium may include: a magnetic disk, an optical disc, a read-only memory (ROM), a random access memory (RAM), or the like.

It may be understood that the embodiments described in the embodiments of the present disclosure may be implemented by hardware, software, firmware, middleware, microcode, or a combination thereof. For implementation with hardware, the processing unit can be implemented in one or more application specific integrated circuits (ASIC), a digital signal processor (DSP), a DSP device (DSPD), a programmable logic device (PLD), a field-programmable gate array (FPGA), general processors, controllers, microcontrollers, micro-processors, and other electronic units for implementing the functions of the present application, or their combinations.

For implementation with software, technologies described in the embodiments of the present disclosure may be implemented by executing functional modules (for example, a process and a function) in the embodiments of the present disclosure. Software code can be stored in the memory and executed by the processor. The memory can be implemented inside or outside the processor.

The embodiments of the present disclosure are described above with reference to the accompanying drawings, but the present disclosure is not limited to the foregoing specific implementations. The foregoing specific implementations are merely exemplary instead of restrictive. Under enlightenment of the present disclosure, a person of ordinary skills in the art may make many forms without departing from the aims of the present disclosure and the protection scope of claims, all of which fall within the protection of the present disclosure.

What is claimed is:

1. A resource assigning method, applied to a second terminal, comprising:
    receiving first location information reported by a first terminal,
    wherein the first terminal is a group member in a first group, and the second terminal is a group head in the first group;
    receiving first resource indicating information or first location indicating information sent by a third terminal, wherein the third terminal is a group head in a second group, the first resource indicating information is used to indicate a resource used by intra-group communication of the second group, and the first location indicating information is used to indicate second location information of a group member of the second group, the group head of the second group, or the group member and the group head of the second group; and
    assigning a resource for the first terminal by a target resource according to the first location information or the first location information and the second location information, the target resource being a resource except for the resource indicated by the first resource indicating information.

2. The method according to claim 1, wherein in a case where the method comprises the receiving the first resource indicating information, the method further comprises:
    sending second resource indicating information to the third terminal, wherein the second resource indicating information is used to indicate a resource used by intra-group communication of the first group; or,
    in a case where the method comprises the receiving the first location indicating information, the method further comprises:
    sending second location indicating information to the third terminal, wherein the second location indicating information is used to indicate first location information of a group member in the first group, a group head in the first group, or the group member and the group head in the first group.

3. The method according to claim 1, before the assigning the resource for the first terminal by the target resource according to the first location information and the second location information, the method further comprising:
    receiving first resource indicating information sent by the third terminal,
    wherein the first resource indicating information is used to indicate a resource used by intra-group communication of the second group, and the target resource is a resource except for the resource indicated by the first resource indicating information.

4. A resource or location indicating method, applied to a second terminal, comprising:
    receiving first resource indicating information sent by a third terminal; or,
    receiving first location indicating information sent by a third terminal;
    wherein the second terminal is a group head in a first group, the third terminal is a group head in a second group, the first resource indicating information is used to indicate a resource used by intra-group communication of the second group, and the first location indicating information is used to indicate second location information of a group member in the second group, a group head in the second group, and the group member and the group head in the second group;
    wherein in a case where the method comprises the receiving the first resource indicating information sent by the third terminal, the method further comprises:
    sending second resource indicating information to the third terminal,
    wherein the second resource indicating information is used to indicate a resource used by intra-group communication of the first group;
    in a case where the method comprises the receiving the first location indicating information sent by the third terminal, the method further comprises:
    sending second location indicating information to the third terminal,
    wherein the second location indicating information is used to indicate first location information of a group member in the first group, a group head in the first group, or the group member and the group head in the first group.

5. A second terminal, comprising a memory, a processor and a computer program which is stored in the memory and executable on the processor, wherein the computer program, when executed by the processor, causes the second terminal to perform steps of:
    receiving first location information reported by a first terminal; wherein the first terminal is a group member in a first group, and the second terminal is a group head in the first group;
    receiving first resource indicating information or first location indicating information sent by a third terminal, wherein the third terminal is a group head in a second group, the first resource indicating information is used to indicate a resource used by intra-group communication of the second group, and the first location indicating information is used to indicate second location information of a group member of the second group, the group head of the second group, or the group member and the group head of the second group; and assigning a resource for the first terminal by a target resource according to the first location information or the first location information and the second location information, the target resource being a resource except for the resource indicated by the first resource indicating information.

6. The second terminal according to claim 5, wherein in a case where the second terminal performs the receiving the first resource indicating information, the computer program, when executed by the processor, causes the second terminal to further perform:

sending second resource indicating information to the third terminal, the second resource indicating information is used to indicate a resource used by intra-group communication of the first group; or, in a case where the second terminal performs the receiving the first location indicating information, the computer program, when executed by the processor, causes the second terminal to further perform:

sending second location indicating information to the third terminal, wherein the second location indicating information is used to indicate first location information of a group member in the first group, a group head in the first group, or the group member and the group head in the first group.

7. The second terminal according to claim 5, wherein the computer program, when executed by the processor, causes the second terminal to further perform:

receiving first resource indicating information sent by the third terminal, wherein the first resource indicating information is used to indicate a resource used by intra-group communication of the second group, and the target resource is a resource except for the resource indicated by the first resource indicating information.

\* \* \* \* \*